United States Patent
Feng (10) Patent No.: US 7,212,279 B1
(45) Date of Patent: May 1, 2007

(54) BIOMETRIC IDENTITY VERIFIERS AND METHODS

(75) Inventor: Chen Feng, Bothell, WA (US)

(73) Assignee: Magna Chip Semiconductor Ltd., Heungduk-gu, Cheongju-si, ChungCheongbuk-do (KR)

( * ) Notice: Subject to any disclaimer, the term of this patent is extended or adjusted under 35 U.S.C. 154(b) by 562 days.

(21) Appl. No.: 10/153,021

(22) Filed: May 20, 2002

(51) Int. Cl.
*G06K 9/74* (2006.01)

(52) U.S. Cl. .................. 356/71; 382/124; 382/125; 382/126; 382/127

(58) Field of Classification Search .............. 356/71; 382/124, 125, 126, 127
See application file for complete search history.

(56) References Cited

U.S. PATENT DOCUMENTS

| | | | |
|---|---|---|---|
| 3,619,060 A * | 11/1971 | Johnson | 356/71 |
| 5,650,842 A * | 7/1997 | Maase et al. | 356/71 |
| 6,353,472 B1 * | 3/2002 | Bault | 356/71 |
| 6,567,539 B1 * | 5/2003 | Benezeth | 382/124 |
| 2001/0013546 A1 * | 8/2001 | Ross | 235/382 |
| 2002/0089410 A1 * | 7/2002 | Janiak et al. | 340/5.53 |
| 2002/0156553 A1 * | 10/2002 | Read | 701/1 |
| 2002/0180584 A1 * | 12/2002 | McGregory et al. | 340/5.26 |
| 2003/0054878 A1 * | 3/2003 | Benoy et al. | 463/29 |
| 2003/0135731 A1 * | 7/2003 | Barkan et al. | 713/155 |
| 2004/0252867 A1 * | 12/2004 | Lan et al. | 382/124 |

* cited by examiner

*Primary Examiner*—Zandra V. Smith
*Assistant Examiner*—Juan D. Valentin, II
(74) *Attorney, Agent, or Firm*—Fernandez & Associates LLP (57) ABSTRACT

For use in verifying the identity of a user, an identity verifier comprising an optical fingerprint sensor coupled to an ID (identification) card reader. In one embodiment of the present invention, the optical fingerprint sensor includes a light source on a PCB assembly, a diffuser that receives light from the light source, a right angle prism that receives light from the diffuser, a collimating lens that receives light from the prism, a first mirror that receives light from the collimating lens, a second mirror that receives light from the first mirror, a third mirror that receives light from the second mirror, an imaging lens that receives light from the third mirror, and an image sensor on the same PCB assembly as the light source that receives light from the imaging lens. In one embodiment of the present invention, an ID (identification) card reader reads an ID card that contains biometric information about the user, and compares the biometric information on the card with the fingerprint of the user captured by the optical fingerprint sensor captured by the optical fingerprint sensor.

10 Claims, 11 Drawing Sheets

*Prior Art*

SECTION A-A

BIOMETRIC IDENTITY VERIFIERS AND METHODS

CROSS REFERENCE TO RELATED APPLICATIONS

This application relates to a co-pending U.S. patent application Ser. No. 10/100,689, filed on Mar. 14, 2002, entitled "Compact Optical Fingerprint Sensor and Method" by Chen Feng, owned by the assignee of this application and incorporated herein by reference.

BACKGROUND INFORMATION

1. Field of the Invention

The present invention is directed in general to biometric identity verifier devices, and more specifically to optical fingerprint identity verifier hardware systems.

2. Description of Related Art

Figure 1:
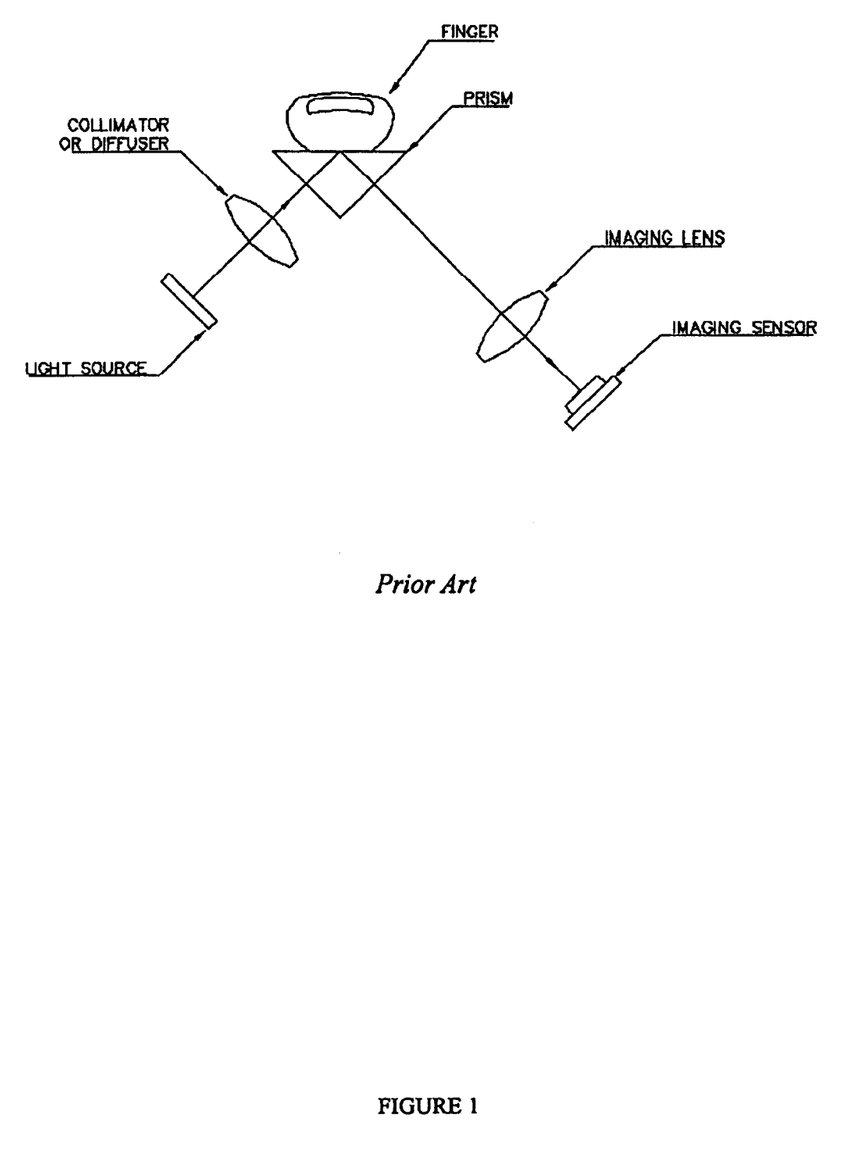
FIG. 1 illustrates an optical path diagram that is characteristic of prior art related to the present invention.

Existing optical fingerprint sensors generally use a right angle prism to capture the fingerprint image. The characteristic optical path in such sensors is illustrated in FIG. 1. Collimated light rays from a light source pass through one side of the prism. These light rays then travels to the top of the prism where a finger is placed. If a light ray impinges on a location where the finger is not in direct contact with the top of the prism, the light ray undergoes total internal reflection, and emerges through the other side of the prism where it is captured by an imaging sensor that is oriented perpendicular to the light ray. Alternatively, if the light ray impinges on a location where the finger is in direct contact with the top of the prism, the light ray does not undergo total internal reflection but is instead absorbed by the skin. Thus, the optical fingerprint sensor captures a pattern of light and dark bands representing the fingerprint.

As a consequence of the characteristic optical path described above, existing optical fingerprint sensors have the following drawbacks: (1) the sensor module has a large volume thereby limiting the range of commercial applications, (2) the non-planar orientation of the light source and the imaging sensor increases the cost to manufacture the sensor module and also limits commercial applications, and (3) the fingerprint image captured by the image sensor is compressed along one direction necessitating software correction of the fingerprint image which increases the cost to manufacture the sensor module and further limits commercial applications.

U.S. Pat. Nos. 5,892,599 and 5,629,764 added a holographic phase grating to the prism so that the image capture plane is normal to the optical axis of the imaging lens in order to remove the image distortion. U.S. Pat. No. 6,240,200 added a series of prisms as an alternative means to remove the image distortion. The problem with these approaches is that they necessitate a bulky and expensive sensor module.

U.S. Pat. No. 5,796,858 used a grating to replace the prism. The problem with this approach is that the fingerprint image quality suffers due to the optical imperfections of the grating.

Accordingly, there is a need for an optical fingerprint sensor that reduces the size and cost of the sensor module while ensuring a high quality of the fingerprint image.

SUMMARY OF THE INVENTION

The present invention provides for a biometric identity verifier. The biometric identity verifier comprises an optical fingerprint sensor coupled to an ID (identification) card reader. In one embodiment of the present invention, the optical fingerprint sensor includes a light source on a PCB assembly, a diffuser that receives light from the light source, a right angle prism that receives light from the diffuser, a collimating lens that receives light from the prism, a first mirror that receives light from the collimating lens, a second mirror that receives light from the first mirror, a third mirror that receives light from the second mirror, an imaging lens that receives light from the third mirror, and an image sensor on the same PCB assembly as the light source that receives light from the imaging lens. In one embodiment of the present invention, an ID (identification) card reader reads an ID card that contains biometric information about the user, and compares the biometric information on the card with the fingerprint of the user captured by the optical fingerprint sensor. In another embodiment of the present invention, the biometric identity verifier includes additional biometric sensors, such as a microphone for voice recognition, and a camera for facial or iris recognition. Advantageously, the integration of additional biometric sensors in the biometric identity verifier increases the accuracy of identity verification. In another embodiment of the present invention, the biometric identity verifier includes an LCD to display the facial, iris, or fingerprint image, providing feedback so the user can more accurately position themselves for successful image capture. The biometric identity verifier described in the present invention can be advantageously embedded in consumer and industrial devices to provide identity verification, including computers, telephones, personal digital assistants, automobiles, and industrial machinery.

Other structures and methods are disclosed in the detailed description below. This summary does not purport to define the invention. The invention is defined by the claims.

DETAILED DESCRIPTION

Figure 2:
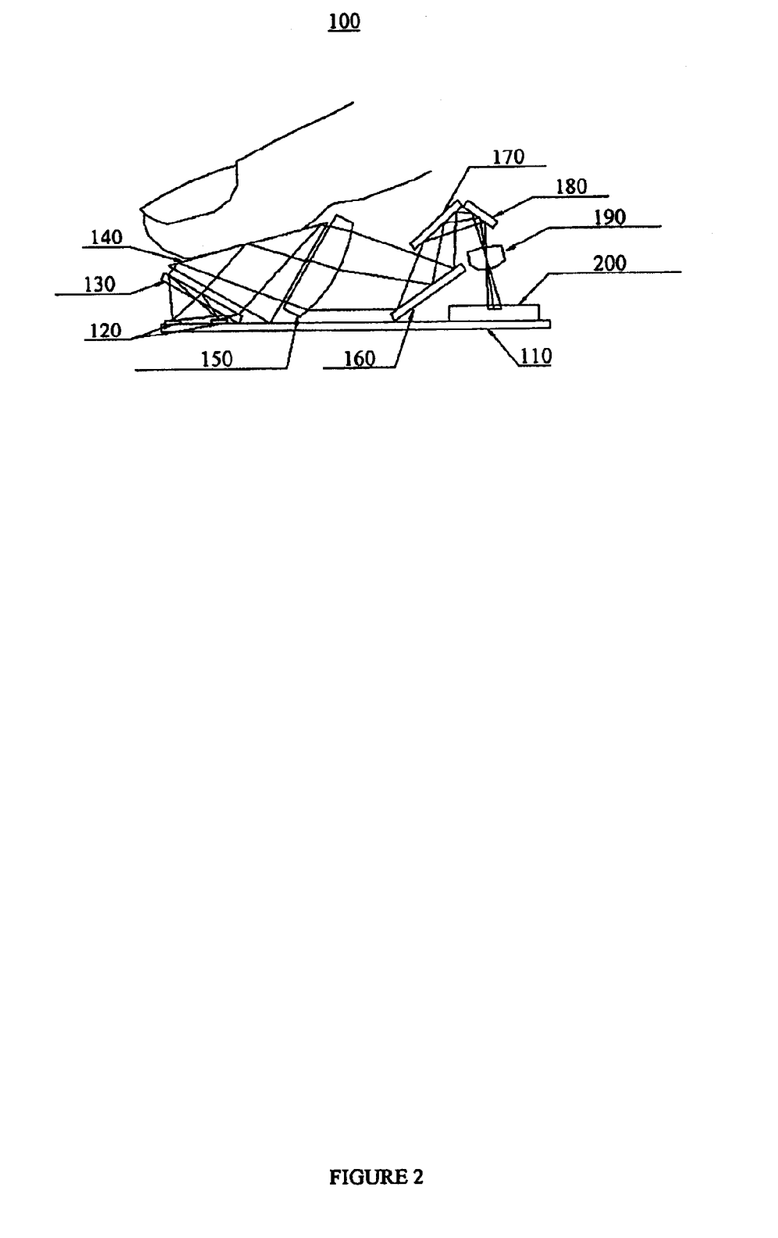
FIG. 2 illustrates an optical path diagram for an optical fingerprint sensor in accordance with the present invention.

FIG. 2 illustrates the optical path through the components of an optical fingerprint sensor 100 in accordance with the present invention. In the preferred embodiment of the present invention, the components comprise a PCB assembly 110, a light source 120, a diffuser 130, a right angle prism 140, a collimating lens 150, a first mirror 160, a second mirror 170, a third mirror 180, an imaging lens 190, and an image sensor 200.

Light rays are emitted from a light source 120 located on the PCB assembly 110 comprising, for example, a number of LEDs.

The light rays then impinge upon a diffuser 130 that changes the direction of the light rays to create a uniform illumination of the right angle prism 140.

The light rays entering the right angle prism 140 then impinge upon the upper surface of the right angle prism 140 where a finger is placed. In the preferred embodiment of the present invention, it is ergonomically beneficial for the upper surface of the right angle prism 140 be inclined at 15 degrees.

The light rays that impinge upon locations where the finger is not in direct contact with the upper surface of the right angle prism 140 undergo total internal reflection.

Upon exiting the right angle prism 140, the light rays impinge upon a collimating lens 150 that causes the exiting light rays to converge and compensates for keystone distortion of the fingerprint image.

The light rays exiting from the collimating lens 150 then reflect from a first mirror 160, a second mirror 170, and a third mirror 180. The combined effect of these three mirrors is to fold the optical path into a small physical volume. Furthermore, the optical path is folded so that the light source 120 and the image sensor 200 can be placed on the same PCB assembly 110. Those skilled in the art should understand that although the preferred embodiment of the present invention uses three mirrors, more or less mirrors could be used, without departing from the spirit of the present invention.

The light rays reflecting from the third mirror 180 then impinge upon an imaging lens 190, which comprises an aspheric lens that forms a high quality fingerprint image on the image sensor 200 located on the PCB assembly 110.

Figure 3:
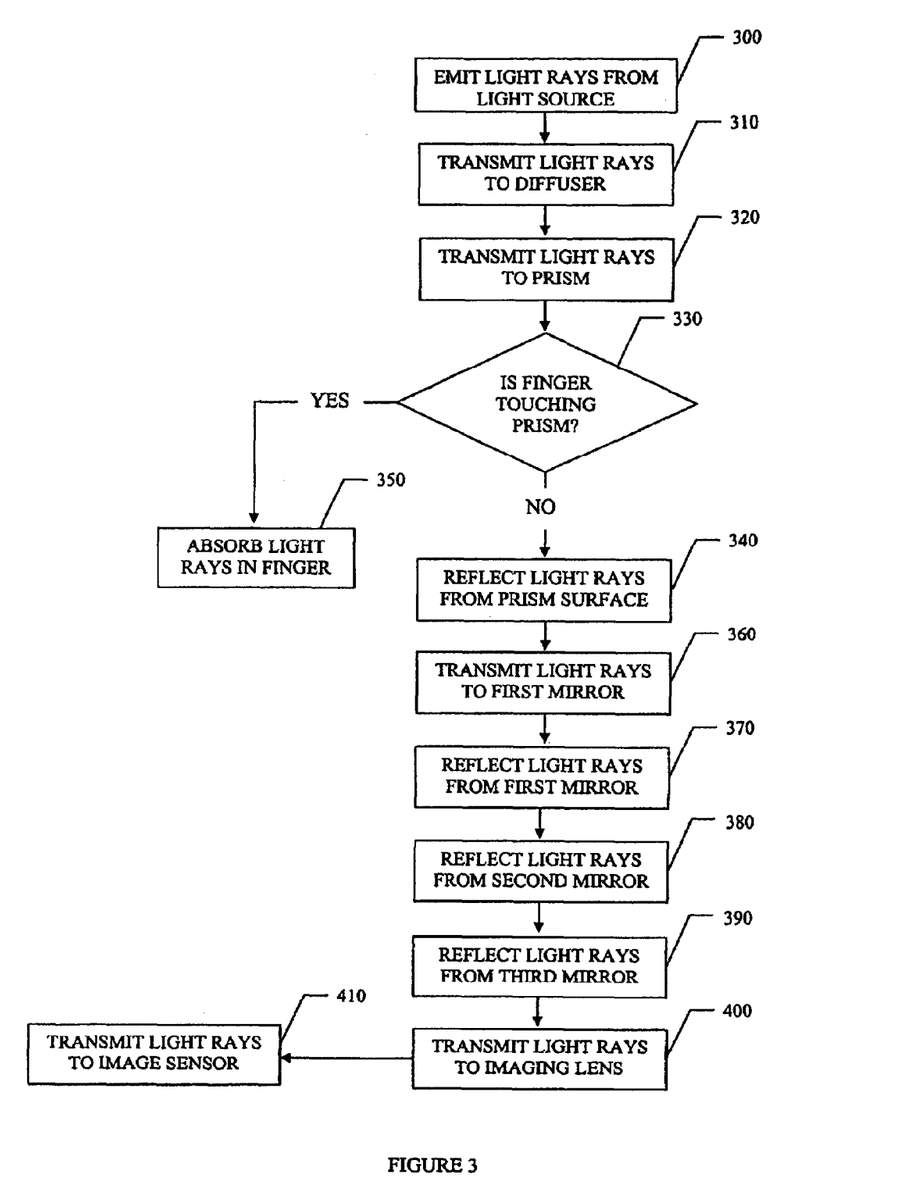
FIG. 3 illustrates a flow diagram of a method for capturing a fingerprint image in accordance with the present invention.
Figure 4A:
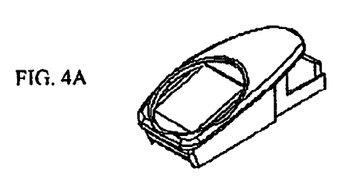
FIGS. 4A–4D illustrate a sensor module assembly for an optical fingerprint sensor in accordance with the present invention.
Figure 4B:
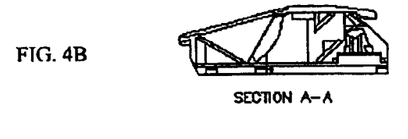
Figure 4C:
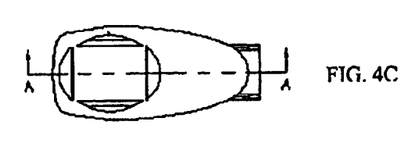
Figure 4D:
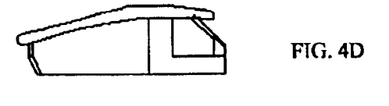

Turning now to FIG. 3, illustrated is a flow diagram of a method for capturing a fingerprint image in accordance with the present invention. Light rays are first emitted from the light source 120 of FIG. 2 in a step 300. The light rays then impinge on a diffuser 130 in a step 310. The light rays then impinge on a prism 140 in a step 320. In a decisional step 330, the lights rays that impinge on the top surface of the prism 140 where a finger surface is present are reflected in a step 340, while other light rays are absorbed by the finger surface in a step 350. The surviving light rays then impinge on a collimating lens 150 in a step 360. The light rays are then reflected off a first mirror 160 in a step 370, a second mirror 170 in a step 380, and a third mirror 180 in a step 390. The light rays then impinge on an imaging lens 190 in a step 400. Finally, the light rays then fall on an image sensor 200 in a step 410.

In the preferred embodiment of the present invention, the image sensor 200 is a single chip that performs all sensor control, in addition to image capture, processing, encoding and transmission. The fingerprint image captured on the image sensor 200 has a perspective distortion of 1 to 2 that can be eliminated in the image capturing circuit by, for example, down sampling the distorted fingerprint image in one direction by 1 pixel for every 2 pixels in the distorted fingerprint image.

In another embodiment of the present invention, the diffuser, prism and collimating lens are combined to reduce the number of components. For example, the diffuser can be formed on one side of the prism surface by means of a Fresnel pattern, while the collimating lens can be formed on the other side of the prism surface by means of a convex surface.

In another embodiment of the present invention, a lens surface or mirror surface is coated with a narrow band-pass filter to reduce ambient light entering the imaging path.

In another embodiment of the present invention, the three mirrors and imaging lens are combined into one customized prism comprising three facets coated with reflective films to form the mirrors, and one with convex curvature to form the imaging lens.

Figure 5:
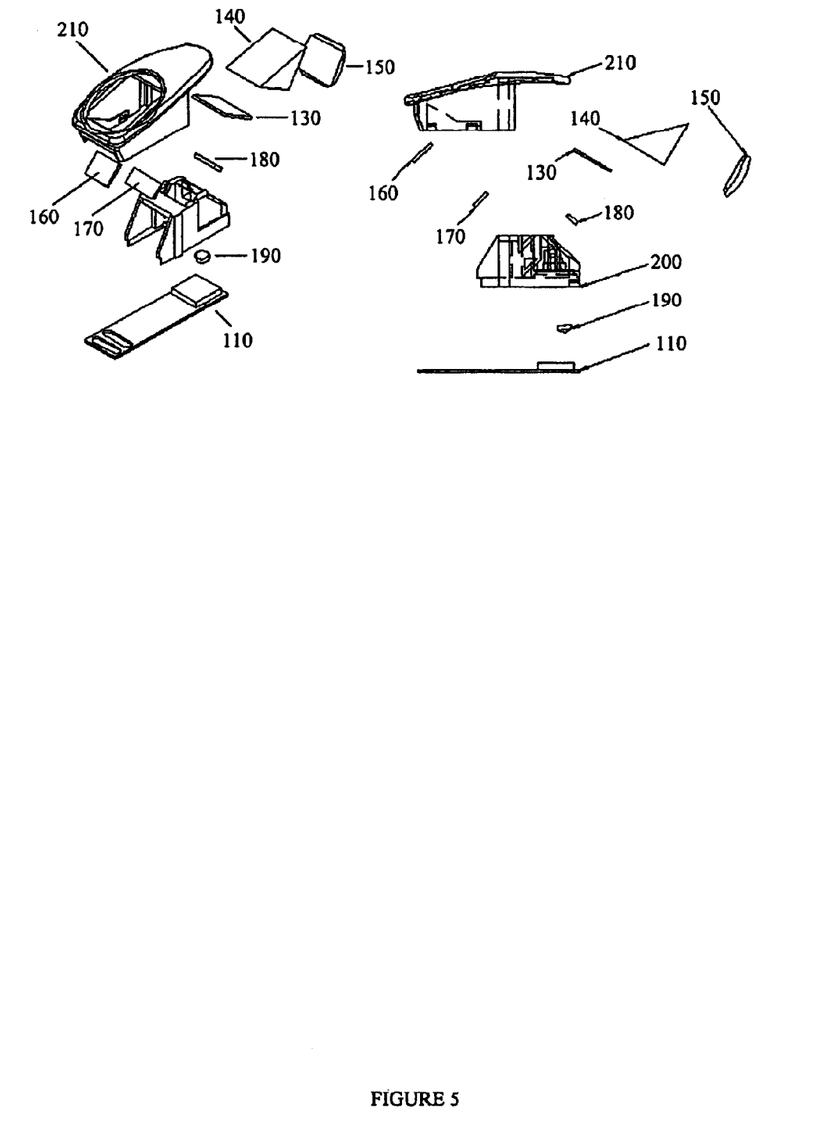
FIG. 5 illustrates an exploded sensor module assembly for an optical fingerprint sensor in accordance with the present invention.

FIGS. 4A–4D illustrate the sensor module assembly in the preferred embodiment of the present invention, while FIG. 5 illustrates an exploded view of the sensor module assembly. Advantageously, the frame-front 210 and the frame-back 200 are used to secure all the components into place without requiring any fasteners.

Figure 6A:
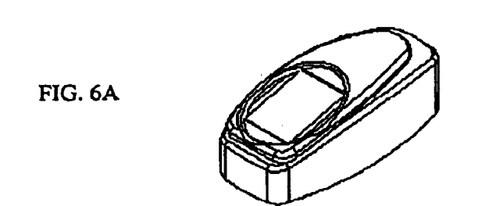
FIGS. 6A–6C illustrate a fingerprint reader containing an optical fingerprint sensor in accordance with the present invention.
Figure 6B:
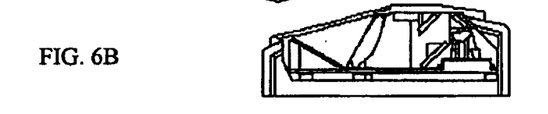
Figure 6C:
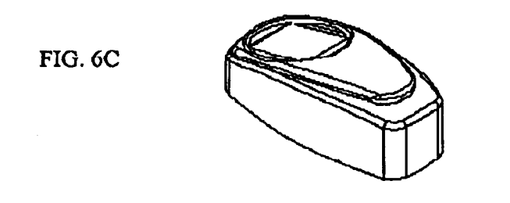

FIG. 6 illustrates a sensor module in accordance with the present invention in a configuration suitable for a stand-alone fingerprint reader.

Because of the compact nature of the sensor module, it can also be easily used as a sub-component enabling other devices to become fingerprint devices, including handheld devices, computer peripherals, and locks.

Figure 7:
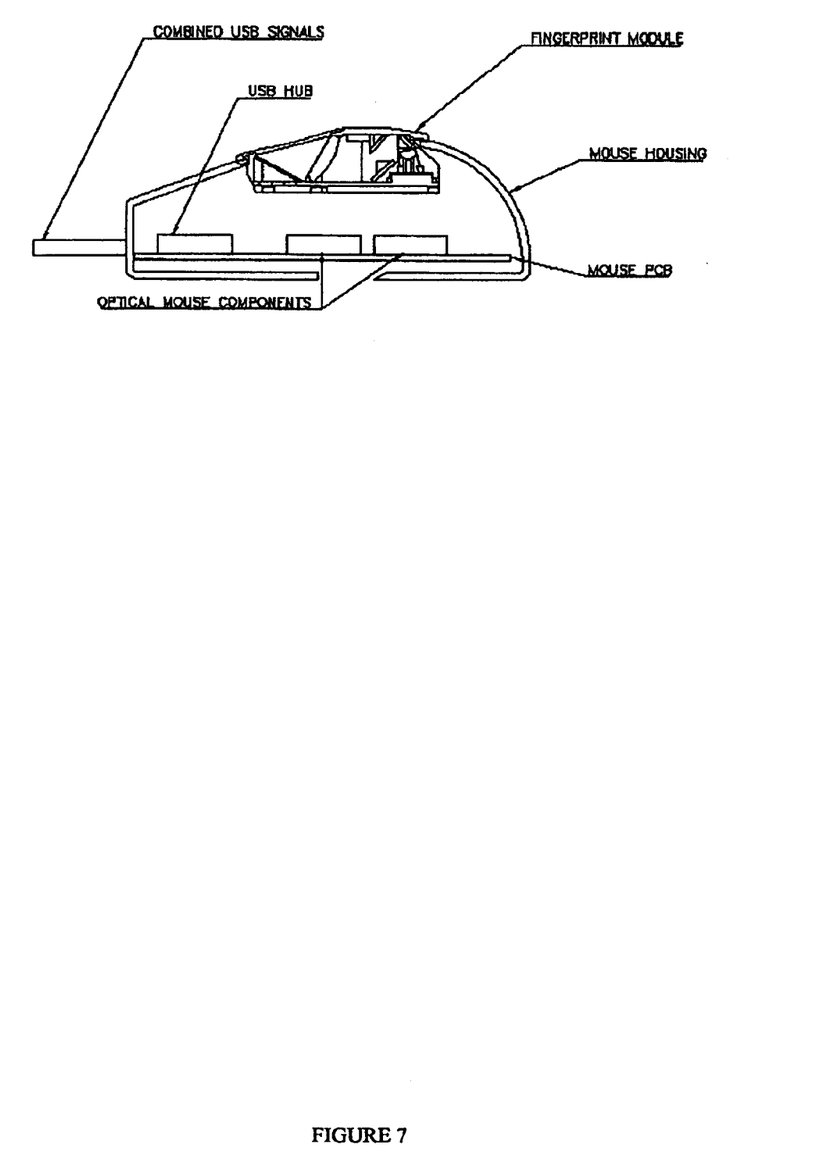
FIG. 7 illustrates an optical mouse containing an optical fingerprint sensor in accordance with the present invention.

FIG. 7 illustrates a sensor module in accordance with the present invention embedded in an optical mouse. The signal from the optical mouse and the fingerprint image are combined into a single feed to enable various verification and authentication applications.

Figure 8:
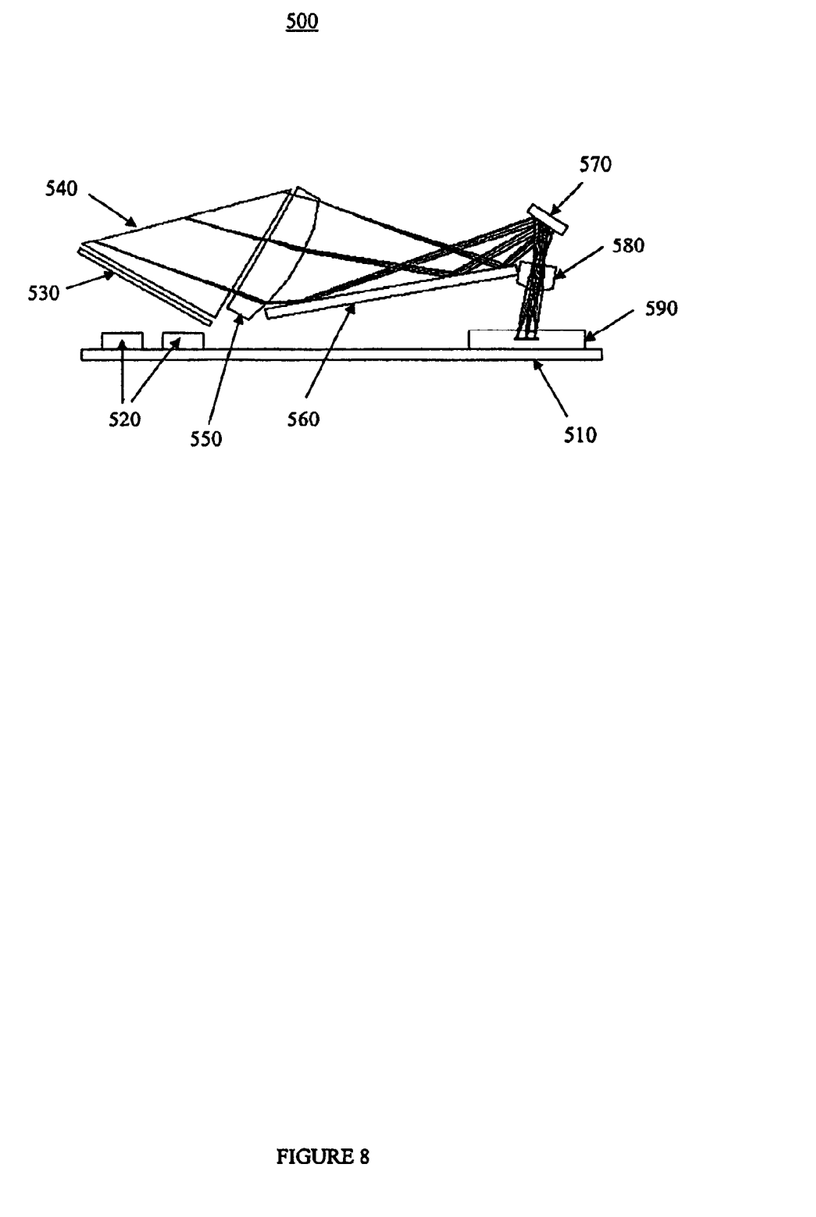
FIG. 8 illustrates an optical path diagram for an optical fingerprint sensor in accordance with the present invention.

In an alternative embodiment of the present invention, the optical fingerprint sensor uses two mirrors. FIG. 8 illustrates the optical path through the components of an optical fingerprint sensor 500 in accordance with the present invention. In the preferred embodiment of the present invention, the components comprise a PCB assembly 510, a light source 520, a diffuser 530, a right angle prism 540, a collimating lens 550, a first mirror 560, a second mirror 570, an imaging lens 580, and an image sensor 590.

Light rays are emitted from a light source 520 located on the PCB assembly 510 comprising, for example, a number of LEDs.

The light rays then impinge upon a diffuser 530 that changes the direction of the light rays to create a uniform illumination of the right angle prism 540.

The light rays entering the right angle prism 540 then impinge upon the upper surface of the right angle prism 540 where a finger is placed. In the preferred embodiment of the present invention, it is ergonomically beneficial for the upper surface of the right angle prism 540 be inclined at 15 degrees.

The light rays that impinge upon locations where the finger is not in direct contact with the upper surface of the right angle prism 540 undergo total internal reflection.

Upon exiting the right angle prism 540, the light rays impinge upon a collimating lens 550 that causes the exiting light rays to converge and compensates for keystone distortion of the fingerprint image.

The light rays exiting from the collimating lens 550 then reflect from a first mirror 560 and a second mirror 570. The combined effect of these two mirrors is to fold the optical path into a small physical volume. Furthermore, the optical path is folded so that the light source 520 and the image sensor 590 can be placed on the same PCB assembly 510.

The light rays reflecting from the second mirror 570 then impinge upon an imaging lens 580, which comprises an aspheric lens that forms a high quality fingerprint image on the image sensor 590 located on the PCB assembly 510.

Figure 9:
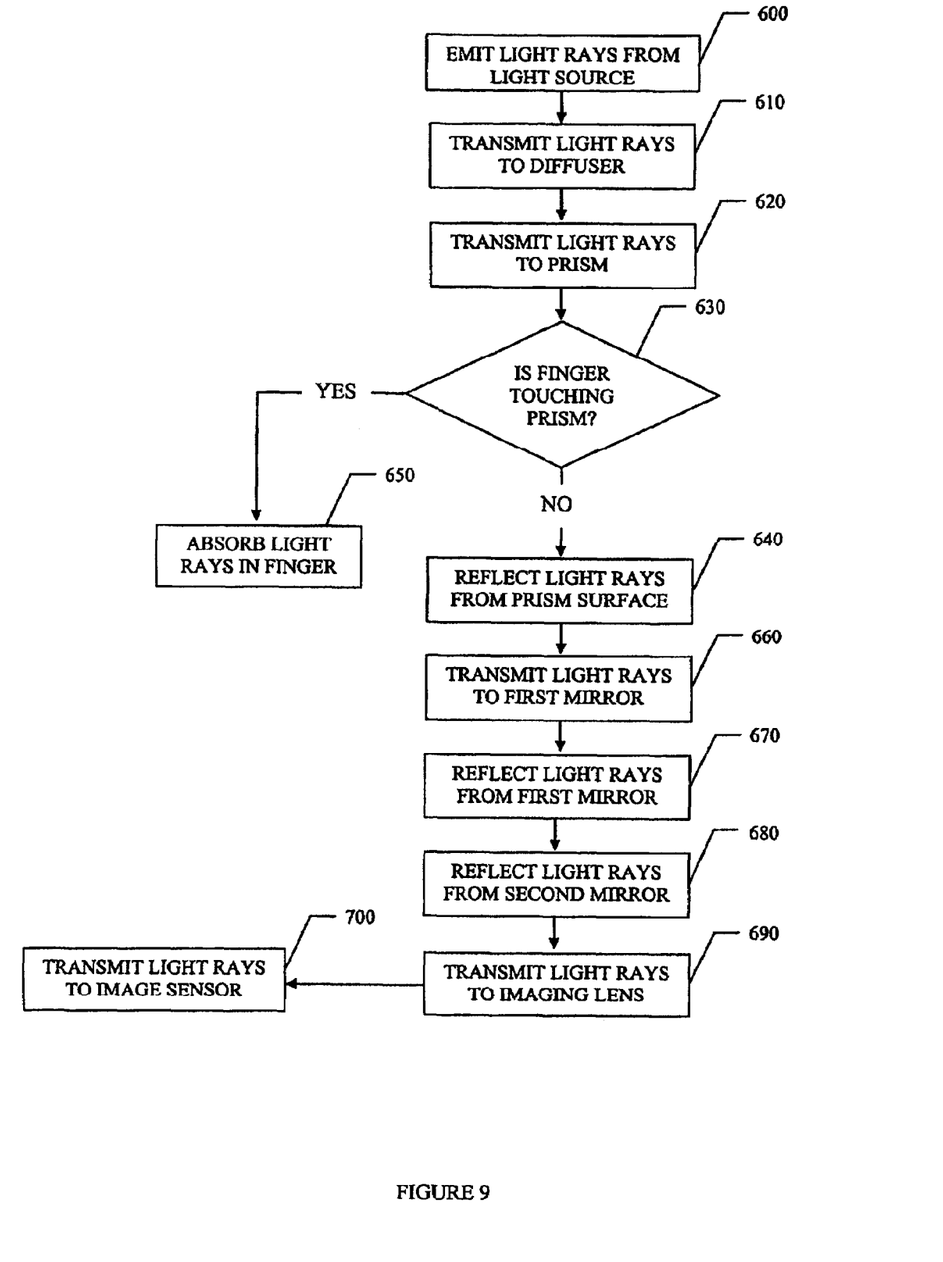
FIG. 9 illustrates a flow diagram of a method for capturing a fingerprint image in accordance with the present invention.
Figure 10A:
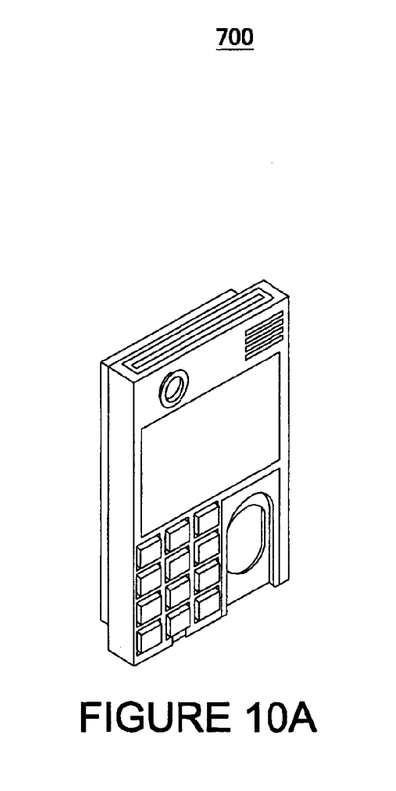
FIGS. 10A–10D illustrate a biometric identity verifier in accordance with the present invention.
Figure 10B:
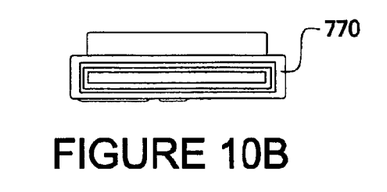
Figure 10C:
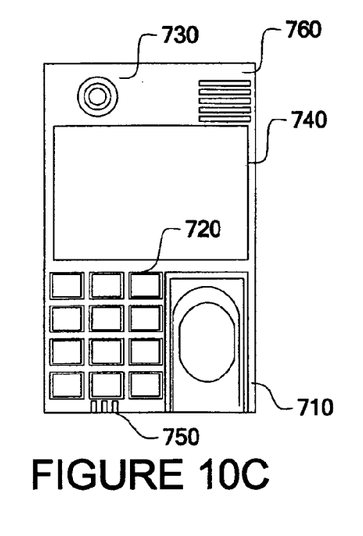
Figure 10D:
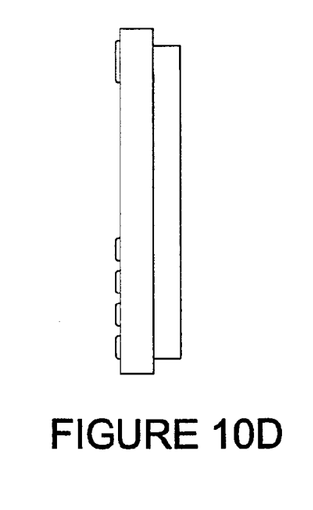

Turning now to FIG. 9, illustrated is a flow diagram of a method for capturing a fingerprint image in accordance with the present invention. Light rays are first emitted from the light source 520 of FIG. 8 in a step 600. The light rays then impinge on a diffuser 530 in a step 610. The light rays then impinge on a prism 540 in a step 620. In a decisional step 630, the lights rays that impinge on the top surface of the prism 540 where a finger surface is present are reflected in a step 640, while other light rays are absorbed by the finger surface in a step 650. The surviving light rays then impinge on a collimating lens 550 in a step 660. The light rays are then reflected off a first mirror 560 in a step 670, and a second mirror 570 in a step 680. The light rays then impinge on an imaging lens 580 in a step 690. Finally, the light rays then fall on an image sensor 590 in a step 700.

In an application of the present invention, the sensor module is a component of a biometric identity verifier 700 illustrated in FIG. 10. In the preferred embodiment, the components of the biometric identity verifier comprise an optical fingerprint sensor 710, a keypad 720, a camera 730, an LCD 740, a microphone 750, a speaker 760, and an ID (identification) card reader 770.

During identity verification of a user, the user's fingerprint image is captured by the optical fingerprint sensor 710, and is compared with biometric information about the user that is stored in an ID card and is read by the ID card reader 770. The ID card reader 770 may read an IC card, smart card, magnetic strip card, RF proximity card, 1D/2D barcode or other ID card.

Advantageously, the biometric identity verifier 700 comprises other biometric sensors, in addition to the optical fingerprint sensor 710. The camera 730 records an image of the user for facial or iris recognition. The microphone 750 records the voice of the user for voice recognition. Integrating several different biometric sensors can improve the overall accuracy of biometric identity verification.

In the preferred embodiment, the biometric identity verifier 700 includes an LCD 740 to display the image captured by the optical fingerprint sensor 710 and the camera 730, providing feedback so the user can accurately position themselves for successful image capture. Feedback assistance in using the biometric sensors can also be provided through the speaker 760.

The biometric features captured by the biometric sensors are compared with the biometric information on the user's ID card. Advantageously, this comparison is performed entirely within the biometric identity verifier, without network connections, to eliminate the possibility of network intrusion.

Figure 11:
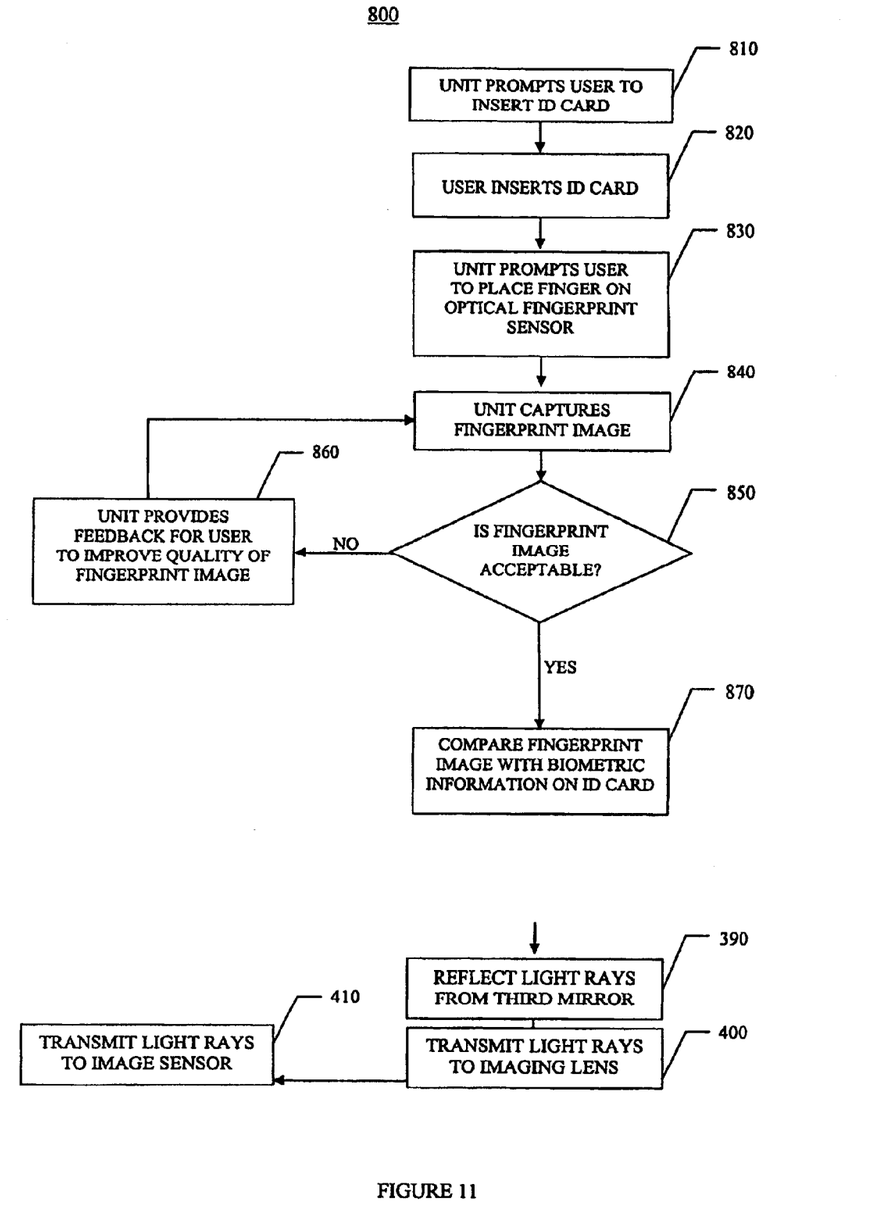
FIG. 11 illustrates a flow diagram of a method for operating a biometric identity verifier in accordance with the present invention.

Turning now to FIG. 11, illustrated is a flow diagram 800 of a method for biometric identity verification in accordance with the present invention. The biometric identity verifier 700 prompts the user to insert an ID (identification) card into the ID card reader 770 in a step 810. The user then inserts his ID card into the ID card reader 770 in a step 820. The biometric identity verifier 700 then prompts the user to place a finger on the optical fingerprint sensor 710 in a step 830. The optical fingerprint sensor 710 then captures the fingerprint image in a step 840. If the quality of the fingerprint image is determined to be unacceptable in a decisional step 850, the biometric identity verifier 700 provides feedback to the user through the LCD 740 so that the user can position their finger more accurately on the optical fingerprint sensor 710. Otherwise, the fingerprint image is compared with the biometric information about the user on the user's ID card in a step 870.

The biometric identity verifier described in the present invention can be integrated into consumer and industrial devices to provide biometric identity verification. Examples of such devices include telephones, personal digital assistants, computers, automobiles, and sensitive industrial machinery such as chip manufacturing equipment.

Although the present invention has been described in detail, those skilled in the art should understand that they can make various changes, substitutions, and alterations herein without departing from the spirit of the invention in its broadest form.

I claim:

1. A system, comprising:
   an optical fingerprint sensor, comprising:
      a light source;
      a prism for receiving a plurality of light rays from said light source, the prism reflecting the light rays when a finger surface is in contact with the upper surface of the prism;
      a first mirror for receiving the plurality of light rays and for reflecting the plurality of light rays;
      a second mirror for receiving the plurality of light rays from the first mirror and for reflecting the plurality of light rays;
      a third mirror for receiving the plurality of light rays from the second mirror and for reflecting the plurality of light rays;
      an imaging lens for receiving the plurality of light rays from the third mirror and focusing the plurality of light rays onto a sensor;
      wherein said light source and said sensor are located on the same printed circuit board; and
   an ID (identification) card reader, coupled to the optical fingerprint sensor, for reading the information from an ID card,
   wherein comparison of the biometric information on the ID card with that obtained from the user is the only necessary means of verification of the user's identity.

2. The system of claim 1, further comprising a diffuser for receiving the plurality of light rays and uniformly distributing the plurality of light rays to the prism.

3. The system of claim 1, further comprising a collimating lens, coupled between the prism and the first mirror, for receiving the plurality of light rays from the prism and for converging the plurality of light rays to the first mirror.

4. An apparatus, comprising:
   an optical fingerprint sensor for detecting a fingerprint of an individual comprising;
      a light source; and
      a sensor;
      three or more mirrors for folding a plurality of light rays from said light source to said sensor;
      wherein said light source and said sensor are located on the same printed circuit board, and
   an ID (identification) card reader for reading information from an ID card, the ID card including biometric information about the individual, wherein the biometric information obtained by the ID card reader is compared to the fingerprint of the individual obtained by the optical fingerprint sensor, wherein comparison of the biometric information on the ID card with that obtained from the user is the only necessary means of verification of the user's identity.

5. The apparatus of claim 4, wherein the apparatus comprises a hand-held device.

6. The apparatus of claim 4, wherein the apparatus comprises a PDA (personal digital assistant) device.

7. The apparatus of claim 4, wherein the apparatus comprises a computer.

8. A method for verifying identification, comprising:
detecting a fingerprint of an individual; and
reading information from an ID card comprising a biometric information on the individual; and
verifying identification of the individual by comparing the fingemrint of the individual to the biometric information of the individual;
wherein comparison of the biometric information on the ID card with that obtained from the user is the only necessary means of verification of the user's identity;
wherein the detecting step comprises:
  emitting a plurality of light rays from a light source;
  reflecting a plurality of light rays at a top surface of a prism, comprising:
    if a finger surface is touching the top surface, absorbing the plurality of light rays that impinges the top surface of the prism by the finger surface, which destroys internal reflection condition; and
    if a finger surface is not touching the top surface, reflecting the plurality of light rays by the internal reflection of the prism;
  collimating the plurality of light rays;
  folding the plurality of light rays through three or more mirrors; and
  detecting the plurality of light rays by a sensor;
wherein an image of said fingerprint is formed on said sensor located on the same PCB as the light source.

9. The method for imaging a fingerprint of claim 8, prior to the step of reflecting a plurality of light rays at the top surface of prism, further comprising receiving the plurality of light rays by a diffuser.

10. The method for imaging a fingerprint of claim 9 after the folding step, further comprising focusing the plurality of light rays through an imaging lens.

* * * * *